March 31, 1964  H. CANCRINUS  3,126,764
INERTIA FLUID TORQUE TRANSMITTER
Filed Nov. 29, 1961  5 Sheets-Sheet 5

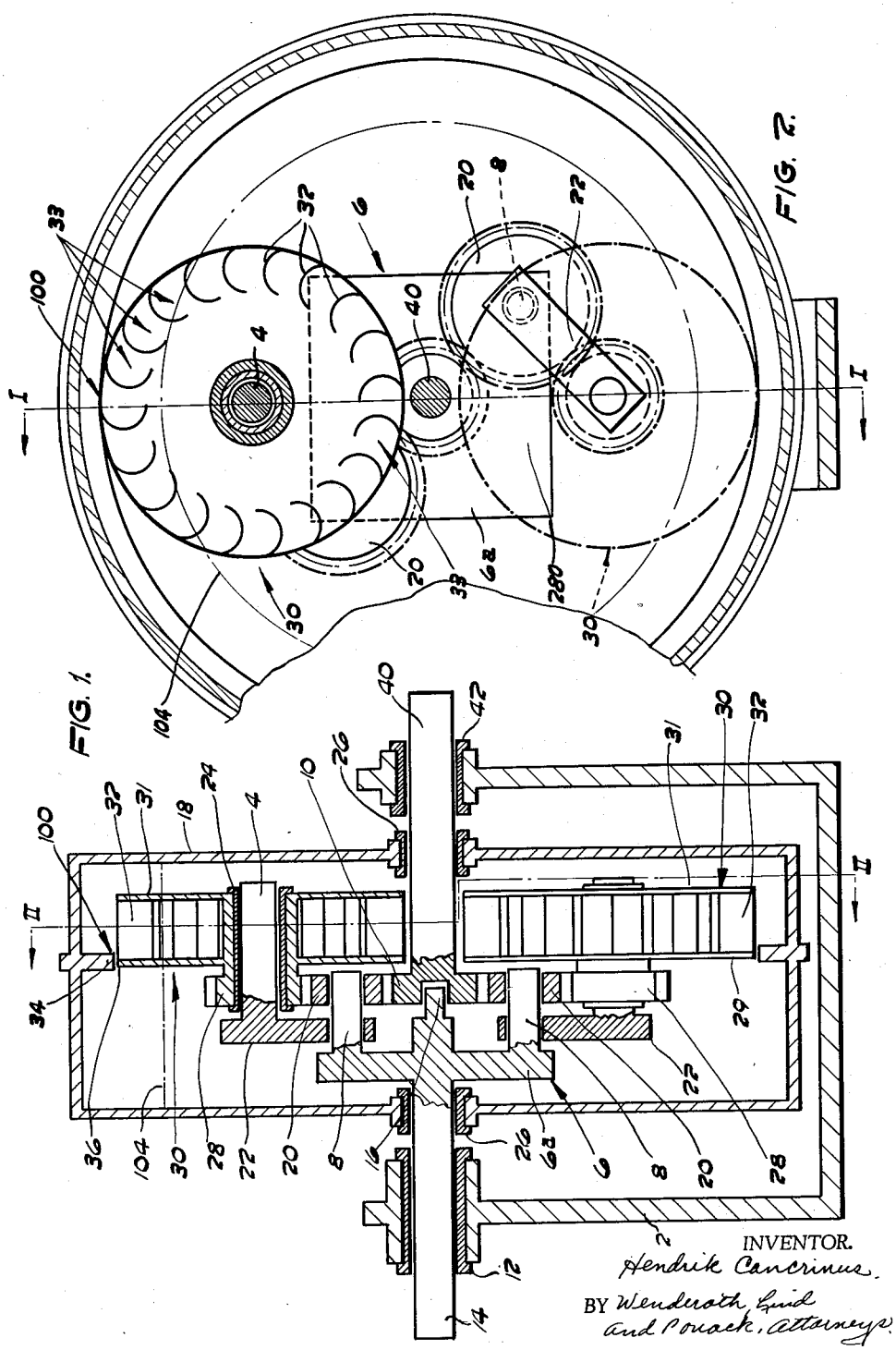

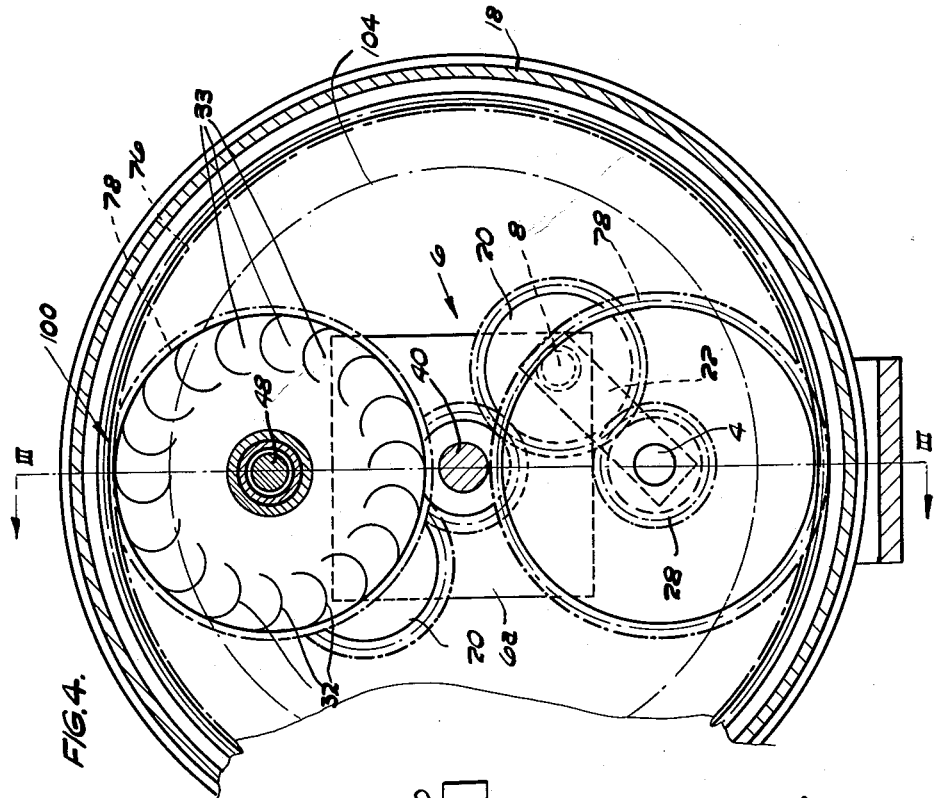

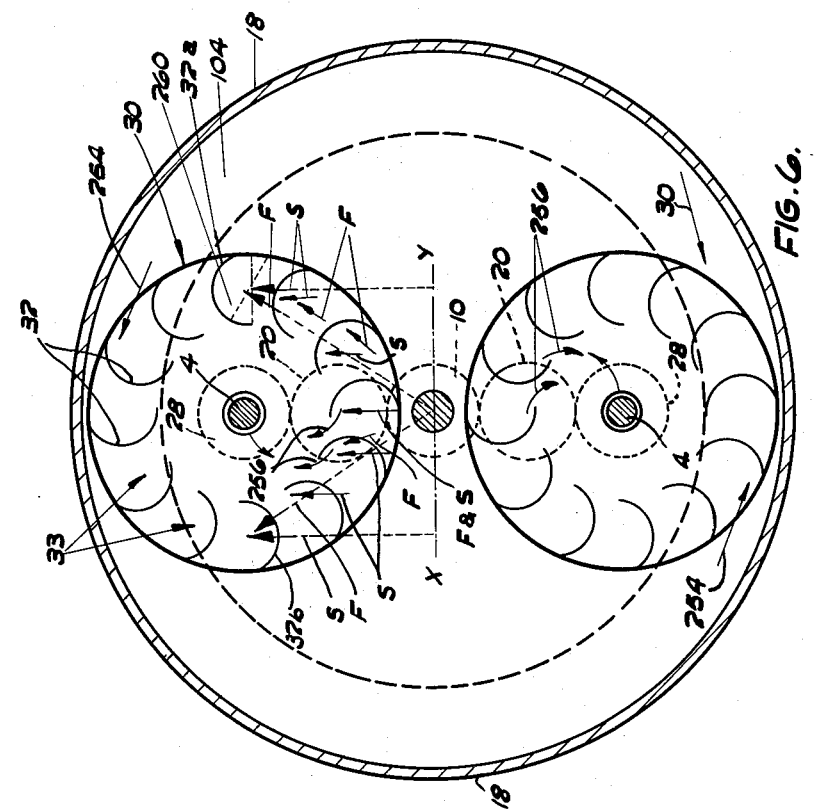

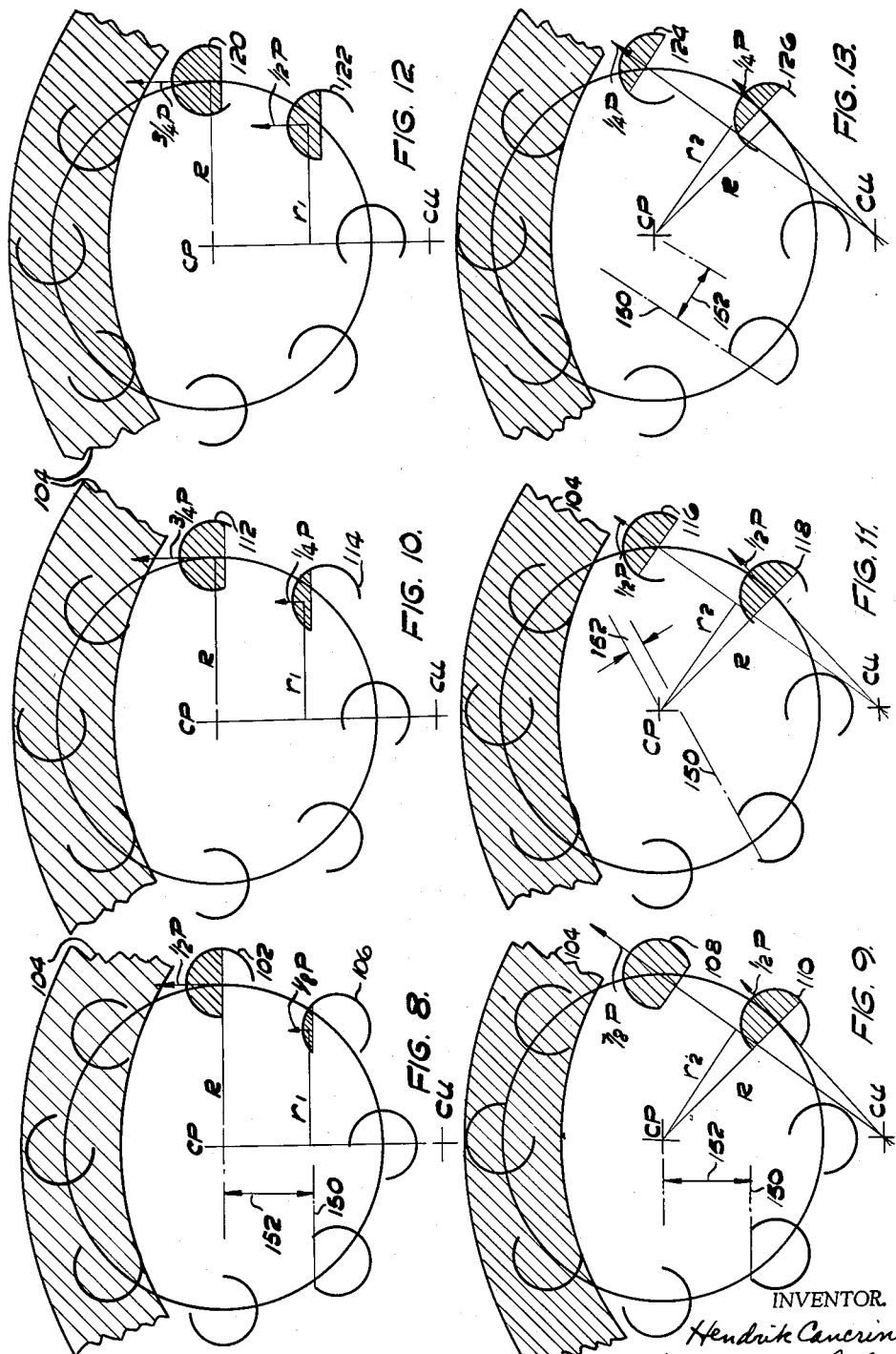

INVENTOR.
Hendrik Cancrinus
BY Wenderoth, Lind
and Ponack,
Attorneys

United States Patent Office 3,126,764
Patented Mar. 31, 1964

3,126,764
INERTIA FLUID TORQUE TRANSMITTER
Hendrik Cancrinus, Hazendal, Cape Town, Cape Province, Republic of South Africa, assignor to Inpower Works (Proprietary) Limited
Filed Nov. 29, 1961, Ser. No. 155,772
Claims priority, application Republic of South Africa Mar. 10, 1961
15 Claims. (Cl. 74—752)

This invention relates to apparatus for transmitting torque by inertia by means of a hydraulic fluid.

It is an object of this invention to provide apparatus for transmitting torque over a range of speeds with flexibility.

According to the invention, a torque transmitter includes a drum disposed about an axis and having means whereby it can be supported for rotation about its axis, a carrier inside the drum and coaxial with it and mounted to rotate within the drum about its axis, at least one planet wheel mounted on the carrier to rotate about its own axis and relatively to the carrier, a sun wheel within the drum and coaxial with the carrier, connecting means connected to the sun wheel for connecting the sun wheel to a load to absorb rotary power, intermediate drive means drivingly connecting the planet wheel to the sun wheel, a plurality of liquid entrapping means fast with the planet wheel and defining recesses spaced circumferentially away from and around the planet wheel axis, and engaging means acting between the drum and the planet wheel and adapted to transmit torque between the drum and the planet wheel; whereby when a quantity of liquid is placed in the drum and the carrier and the drum rotate about the carrier axis, the liquid is flung out in an annular layer against the inner peripheral surface of the drum under the action of centrifugal force, to permit the liquid entrapping means to dip into the layer of liquid to receive liquid during rotation of the carrier, and whereby, when the planet wheel rotates relatively to the carrier, the liquid entrapping means brings liquid from the outer layer and rejects it in the region of the carrier axis in a direction outwardly towards the annular layer.

The invention may include one or more of the following features.

If desired, a frame may be provided for supporting the drum and carrier rotatably. There may be provided a plurality of planet wheels each having a plurality of containers and rotatably mounted in dynamic balance about the carrier axis, and the axes of the planet wheels may be parallel to the carrier axis. The intermediate drive means may be adapted to transmit torque developed about the planet wheel axis to have the same direction about the carrier axis. The containers may be mounted on a planet wheel to have their openings directed in one direction about the planet wheel axis; whereby when a quantity of liquid is placed in the drum and when the carrier and drum rotate, the liquid is flung out in an annular layer against the inner peripheral surface of the drum under the action of centrifugal force during rotation of the drum about its axis, and the containers during rotation of the carrier dip into the layer of flung out liquid to receive liquid into them and whereby the containers in the region of the carrier axis release previously received liquid in a direction outwardly towards the annular layer and past the planet wheel axis.

The carrier may be provided with drive connecting means for connecting the carrier to a source of rotary power. Alternatively the drum may be provided with drive connecting means for connecting it to a source of rotary power.

The engaging means may include an internal gear fast with the drum, and a toothed wheel fast with the planet wheel and in mesh with the internal gear. The engaging means may also include a track around the inner periphery of the drum, and a shoe or roller fast with the planet wheel and adapted to roll on the track, and the carrier may include a main part, and a swing arm for each planet wheel and mounted on the main part to pivot about an axis parallel to the planet wheel axis, the planet wheel being mounted on the swing arm; whereby the swing arm is adapted to swing outwardly thus causing the roller to abut against the track.

When the drum is provided with drive connecting means for connection to a source of rotary power, there may be provided bias means abutting between main part and swing arms and urging the swing arms outwardly to cause the rollers to abut against the track.

The intermediate drive means may include a toothed gear train including toothed gear wheels fast with the sun and planet wheels and an idler gear wheel in mesh with sun and planet wheels and mounted in the carrier main part to rotate about the swing arm pivotal axis. Alternatively, in a transmitter having the planet wheel, carrier, and swing arm pivotal axes parallel to each other, the intermediate drive means may include a sprocket wheel fast with the sun wheel, a sprocket wheel fast with the planet wheel, and a chain in mesh with them both; and in which there is provided a lever mounted on the main part to pivot about an axis parallel to the arm axis, a jockey sprocket in mesh with the chain and mounted on the lever to rotate about an axis parallel to the axis of the sprockets, and bias means urging the jockey sprocket into mesh with the chain.

The bucket wheel may include a plurality of containers between a pair of axially spaced plates, and each container may be of substantially C-shape in section, the container opening being defined by the opposed lips of the C-section; whereby the positions of the containers and of their openings relative to the planet wheel axis may be varied suitably between the plates, before being secured in position on the plates, in order to obtain varying torque characteristics.

The ratio between planet wheel and sun wheel pitch diameters is preferably not less than about one half, the degree of eccentricity of the containers to the planet wheel axis not exceeding the distance between the planet wheel and carrier axes. The ratio may be conveniently of the order of unity, and preferably is unity.

Further features of the invention will become apparent from the following description of specific embodiments with reference to the accompanying diagrammatic drawings.

In the drawings:

FIGURE 1 shows a sectional side elevation of one embodiment of the invention at I—I;

FIGURE 2 is a sectional end elevation at II—II and corresponding to FIGURE 1;

FIGURE 3 is a sectional side elevation similar to FIGURE 1 of another embodiment at III—III;

FIGURE 4 shows a sectional end elevation at IV—IV corresponding to FIGURE 3;

FIGURE 5 is a part sectional elevation showing a further feature of the invention;

FIGURE 6 shows a sectional end elevation and the direction of forces acting upon containers and their contents;

FIGURE 7 shows a cross-sectional detail view of a container;

FIGURES 8 to 13 show sectional end elevations of bucket wheels for various dispositions of buckets about the bucket wheel axis;

Figure 14:
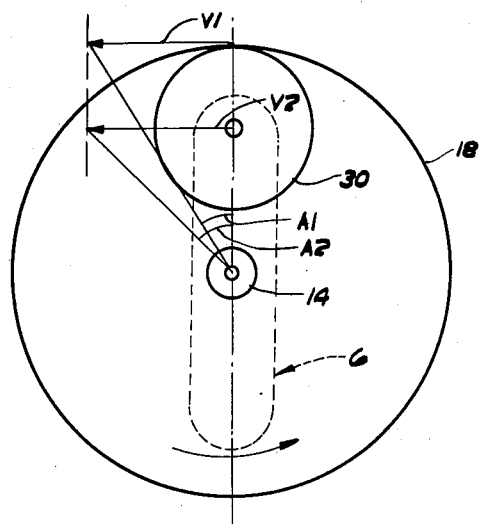
FIGURE 14 shows a velocity diagram of the parts of one embodiment of the invention when the carrier is connected to the input shaft.

Referring to the drawings, reference numeral 2 refers to a frame supporting rotatably input shaft 14 in bearing 12 and coaxially output shaft 40 in bearing 42. Journal 16 of input shaft 14 runs in a mating socket of output shaft 40.

Fast with input shaft 14 there is provided a carrier generally designated by reference numeral 6 comprising a main part 6a and swing arms 22 and having pins 8 whose axes are parallel to the axis of the input and output shafts, and which carry idler toothed gear wheels 20 in mesh on the one hand with an output toothed gear sun wheel 10 fast and coaxial with the output shaft 40, and in mesh on the other hand with planet wheels 28 mounted to rotate on bushes 24 on pins 4 connected to the carrier main part 6a via swing arms 22 mounted to pivot about the axes of pins 8, on which the idlers 20 also can rotate. Planet wheels 28 and sun wheel 10 have equal numbers of teeth. Alternatively, referring to FIGURE 5, pins 4 may be mounted to pivot about the axes of transverse pin 101, relative to carrier main part 6a.

Fast with each planet wheel 28 there is provided a bucket wheel 30 comprising a pair of axially spaced plates 29 and 31 and a plurality of circumferentially spaced buckets 32 of substantially C-section, and having their openings 33 directed in one direction about the bucket wheel axis. Around the outside of the carrier 6 and planet wheels 28 and coaxial with input shaft 14 and output shaft 40 there is provided a drum 18. This drum 18 has a ring track 34 adapted to engage frictionally with plate 29 of bucket wheel 30. Or the drum may engage via internal gear teeth 76 with teeth 78 on the bucket wheel (see FIGURES 3 and 5). The drum 18 may be mounted to rotate freely on both the input and output shafts 14 and 40 on bushes 26 (see FIGURE 1), but alternatively it may be keyed to the input shaft 14 by means of key 72 (see FIGURE 3).

Referring again to FIGURE 5 it will be noted that the engagement region 100 between ring track 34 and planet wheel face 103 may be made of larger or smaller diameter as required, depending upon the torque characteristics desired. In FIGURES 1 to 4, the engagement region occurs at the bucket wheel periphery. The effect of variation in the engaging region diameter will be more fully described herafter.

Referring to FIGURES 6 and 7 there is shown a detail of buckets 32. The bucket opening 33 of substantially C-section is defined by opposed lips comprising outer lip 250 and inner lip 252. Liquid is received into a bucket in the direction of arrow 254 between outer lips 250 of adjacent buckets. Rejection of liquid takes place over the inner lip 252 of a bucket in direction of arrows 256. It will be noted that the openings defined by the lips 250 and 252 are directed transversely away from the hypothetical arms connecting the buckets 32 to the planet wheel axis.

In operation, referring to FIGURES 1 and 2 of the drawings, hydraulic fluid is placed inside the drum 18. When a torque is applied to the input shaft 14 in an anti-clockwise direction when looking in the direction II—II, the carrier 6 will rotate with the input shaft 14 carrying the idlers 20 with it. If the output shaft 40 i.e. sun wheel 10 is stationary the idler wheels 20 will rotate about their axes in an anti-clockwise direction thus causing the planet wheels 28 to orbit about the input shaft axis such that for every revolution of the carrier 6 in one direction about its axis, the planet wheel 28 performs a revolution in the opposite direction about its shaft relative to the carrier when sun and planet wheel teeth are equal in number. The planet wheel and hence the bucket wheel thus perform a motion which may be termed circular translation. Rotation of the carrier 6 causes the drum 18 also to rotate about the carrier and drum axis, the drum being caused to rotate by the engaging means. The hydraulic fluid is flung out in an annular layer 104, and buckets 32, in circular translation dip into the layer 104 and carry fluid with them. Centrifugal force acting on the hydraulic fluid in the buckets 32 tends to displace the hydraulic fluid within the buckets in an anti-clockwise direction about the planet wheel axis (looking in the direction of FIGURE 6). The buckets prevent this taking place freely thus imparting an anti-clockwise torque on the bucket wheel 30. This torque is transmitted through the idlers 20 onto sun wheel 10 and is available as an output torque on the output shaft 40 for driving a load. While the output shaft is not yet up to speed, the buckets pick up hydraulic fluid from the outer layer 104, and bring it nearer to the drum axis and discharge it in the region of that axis.

The motion termed circular translation may best be described with reference to FIGURE 6. When sun wheel 10 and planet wheel 28 pitch diameters are equal and when the output shaft is stationary and rotary power is applied to the input shaft (whether connected to drum 18 or carrier 6) to cause the carrier 6 to rotate about its axis, the bucket wheels 30 are carried around with the carrier. The bucket wheels 30, in peforming circular translation, remain stationary relative to their axes during the orbiting of pins 4 about the carrier axis. In other words all the buckets will maintain their positions relative to the axis. For example, buckets 32a and 32b will maintain their horizontally opposed positions as shown in FIGURE 6, throughout the entire orbit of pin 4.

Referring further to FIGURE 6, in a particular position of the bucket wheel, and at a particular instant, the arrows S show the direction of centrifugal force on the several buckets and their contents during circular translation. It will be noted that for the position of the bucket wheel as shown, the forces are in a direction at right angles to a line such as XY, and they remain at right angles to lines such as XY, for succeeding positions of the bucket wheel during circular translation, irrespective of the position of the bucket wheel relative to the carrier axis. In other words, during circular translation, the centrifugal forces on the various buckets and their contents are parallel to each other and to the line joining the axes of the bucket wheel and the carrier. The line XY is at right angles to the line joining these axes.

As the output shaft starts turning and speeds up so the bucket wheels 32 pass through the liquid layer 104, and rotate about their axes and bring liquid 260 down against the action of centrifugal force and discharge the liquid in the direction of arrow 256 in the region of the carrier axis (see FIGURE 6) under the action of centrifugal force. As the output shaft speeds up so the direction of the centrifugal force approaches the carrier axis until when direct drive between input and output shafts is obtained, the centrifugal force is directed away from the carrier axis. (See arrows F.)

It will be realised that the action above described will take place even if the ratio between planet wheel and sun wheel pitch diameters vary from unity. If the ratio is not unity, then during the start up period, that is in speeding up the output shaft from rest, the bucket wheels 30 will rotate about their axes. The limiting ratio will be that one which ensures that during the start up period, the rejection of fluid can still take place outwardly from the region of the carrier axis past the planet wheel axis towards the annular layer, and such that centrifugal force directed outwardly from the planet wheel axis due to rotation of the planet wheel about its axis does not become predominant.

Ultimately when the speeds of input and output shafts are equal, the bucket wheels 30 rotate with the carrier 6 as if they are fast with it. The hydraulic fluid having gathered in the buckets at a region where it has a turning moment about the bucket wheel axis to balance the output torque required, the turning moment being generated by centrifugal force on the liquid due to rotation of carrier and bucket wheels as a unit about the input output shaft axis. The centrifugal force loads on the buckets 30 are taken on the rail 34 fast with drum 18, thus taking these loads off the bushes 24 around pins 4.

Referring to FIGURES 3 and 4, the carrier 6 is shown mounted to rotate on the input shaft 14, the bucket wheel teeth 78 being in engagement with internal gear teeth 76 of the drum 18. Rotation of the drum 18 causes the bucket wheels 30 to perform circular translation movement as before described (the numbers of teeth of sun wheel and planet wheels being equal), when the output shaft is stationary and causes a torque to be applied to the output shaft as before. The method of operation when input and output shafts rotate at the same speed is also as described before. When the speed of the output shaft is lower than the speed of the input shaft, the rotational speed of the carrier 6 is higher than the rotational speed of the drum 18.

Referring to FIGURES 8 to 13, a part of a fluid drive unit is shown, 104 being the layer of liquid in the drum 18. C.P. is the centre of the planet wheel and C.U. is the centre of the unit, i.e. carrier and drum axis. During starting i.e. when output shaft is stationary (see FIGURES 8, 10 and 12), the centrifugal force $P$ on the liquid is directed parallel to the line CP—CU, about CP the planet wheel axis, due to circular translation of the bucket wheels about the unit axis CU. During full speed operation (see FIGURES 9, 11 and 13), the centrifugal force $P$ is directed through CU about CP due to rotation of the bucket wheels bodily with the carrier about the axis which is coaxial with input and output shafts. As may be required, the opening in the buckets can be so designed to give a full speed torque greater than the starting torque as is shown in FIGURES 8 and 9.

In FIGURE 8, conditions at starting are shown. In FIGURE 8 the moment on the output shaft is proportional to the hatched area shown of bucket 102 in the direction of arrow $\frac{1}{2}P$ times the effective arm $R$ plus the hatched area shown of the bucket 106 in the direction of arrow $\frac{1}{8}P$ times the effective arm $r1$. In FIGURE 9 conditions at full speed are shown, the created moment is proportional to the hatched area shown of bucket 108 in the direction of arrow $\frac{7}{8}P$ times $r2$ plus hatched area shown of bucket 110 in direction of arrow $\frac{1}{2}P$ times $R$. For practical purposes $r1$ is equal to $r2$. The comparative moments therefore are:

FIGURE $8 = R \times \frac{1}{2}P + r1 \times \frac{1}{8}P$ for starting;
FIGURE $9 = R \times \frac{1}{2}P + r2 \times \frac{7}{8}P$ for full speed.

It is therefore clear that the full speed torque is greater than the starting torque, for this arrangement of bucket openings 33 in which the bucket openings lie in planes 150 trailing CP by a length 152.

In FIGURES 10 and 11 the openings of the buckets are of such a magnitude and are so placed, that the comparative moments are as follows:

FIGURE $10 = R \times \frac{3}{4}P + r1 \times \frac{1}{4}P$ for starting;
FIGURE $11 = R \times \frac{1}{2}P + r2 \times \frac{1}{2}P$ for full speed.

The ratio between $r1$ and $R$ (or $r2$ and $R$) is so that the moments in both ranges are substantially the same. It will be noted that the plane 150, in the arrangement of FIGURES 10 and 11, lies very close to CP.

In FIGURES 12 and 13 the opening of the buckets are of such a magnitude and are so placed, that the comparative moments are as follows:

FIGURE $12 = R \times \frac{3}{4}P + r1 \times \frac{1}{2}P$ for starting;
FIGURE $13 = R \times \frac{1}{4}P + r2 \times \frac{1}{4}P$ for full speed.

It is clear that in this case the starting torque exceeds the full speed torque. In this case the plane 150 leads the centre CP by a substantial amount.

Thus the characteristics of the device insofar as starting and full speed torque conditions are concerned, may be varied to suit particular requirements for varying torque characteristics merely by suitably disposing the buckets and their openings relative to the bucket wheel axis.

Referring to FIGURE 14, there is shown a velocity diagram of the bucket wheel 30 and drum 18 when the carrier 6 is fast with the input shaft 14, and the drum 18 is mounted to rotate about its axis, the rotational speed of the carrier being the same as the rotational input speed. Assuming there is full engagement between bucket wheel teeth 78 and teeth 76 of drum 18, i.e. engagement without slip, and assuming that the output shaft is stationary, then the tangential speed $V_1$ of the drum 18 is the same as the speed $V_2$ of the planet wheel 36 because of circular translation. Accordingly the angular speed $A_1$ of the drum about its axis and of the liquid layer inside is less than the angular speed $A_2$ of the carrier which has a speed equal to the input speed. Variations in this ratio of angular speeds can be made by making suitable choices of the engaging diameter between drum and planet wheels. Thus the engaging diameter between drum and planet wheel in FIGURE 5 is less than that shown in FIGURES 1 and 3.

Figure 15:
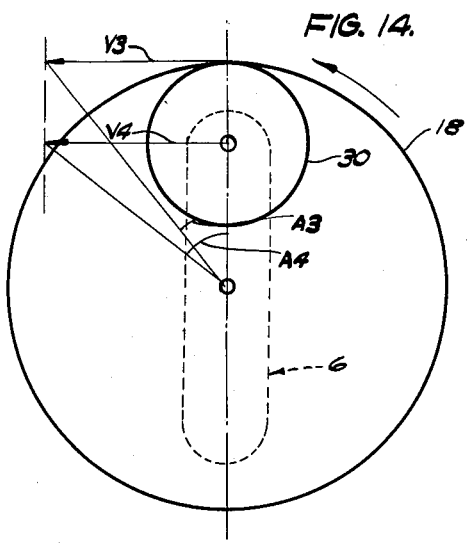
FIGURE 15 shows a velocity diagram of the parts of another embodiment of the invention when the drum is connected to the input shaft.

Referring to FIGURE 15, there is shown a velocity diagram of the planet wheel 30 and carrier 6 when the drum 18 is fast with the input shaft 14 and when the carrier 6 is mounted to rotate on the input shaft 14. When the output shaft is stationary, the planet wheel, being in engagement with the drum, has the same direction and speed of rotation $V_4$ as the drum $V_3$ (i.e. $V_3 = V_4$). But for this condition the carrier angular speed $A_4$ about its axis is greater than the angular speed $A_3$ of the drum and liquid layer about the drum axis.

In use, a hydraulic fluid is charged into the drum 18. Rotation of the planet wheels and bucket wheels due to an input torque applied to the input shaft, causes the buckets to displace fluid which is subjected to centrifugal force. This centrifugal force provides a torque about the planet wheel axis which is transmitted to the output shaft via the idler wheels. In addition a drag torque is exercised on the buckets by them passing through or moving relatively to the layer of liquid in the drum, and this is also transmitted to the output shaft, thus being adapted to provide a high starting torque. If the output shaft loses speed under load then the carrier angular speed increases and hence the torque transmission capacity increases, due to increased drag torque as a result of this differential action. This increase in speed of the carrier causes the buckets to move relatively faster through the liquid layer 104, and hence a larger drag torque is available for increasing the speed of the output shaft. The greater this differential between liquid layer and bucket speeds, the greater the drag torque available for speeding up the output shaft. This applies to the embodiment in which the drum is fast with the output shaft. (See for example FIGURES 3 and 15.)

The difference in speed between the layer of liquid in the drum and the planet wheel buckets when the ratio of the speed of the input shaft to that of the output shaft is greater than unity, can therefore be predetermined according to requirements, by suitably choosing the diameter of the engaging region of the engaging means.

In the drawings, the frame 2 has been shown as supporting the input and output shafts, but it will be clear that such a frame is merely optional because the shafts may be merely secured to their respective mating shafts and be supported by them.

I claim:
1. A torque transmitter which includes a drum disposed about an axis and having means whereby it can be supported for rotation about its axis, a carrier inside the drum and co-axial with it and mounted to rotate within the drum about its axis, at least one planet wheel mounted on the carrier to rotate about its own axis and relatively to the carrier, a sun wheel within the drum and co-axial with the carrier, connecting means connected to the sun wheel for connecting the sun wheel to a load to absorb rotary power, intermediate drum means drivingly connecting the planet wheel to the sun wheel, a plurality of liquid-entrapping means fast with the planet wheel and defining recesses spaced circumferentially away from and around the planet wheel axis, and engaging means acting between the drum and the planet wheel and adapted to transmit torque between the drum and the planet wheel; whereby when a quantity of liquid is placed in the drum and the carrier and the drum rotate about the carrier axis, the liquid is flung out in an annular layer against the inner peripheral surface of the drum under the action of centrifugal force, to permit the liquid-entrapping means to dip into the layer of liquid to receive liquid during rotation of the carrier, and whereby when the planet wheel rotates relatively to the carrier, the liquid-entrapping means brings liquid from the outer layer and rejects it in the region of the carrier axis in a direction outwardly towards the annular layer.

2. A torque transmitter according to claim 1 in which there is provided a plurality of planet wheels each having a plurality of containers comprising the liquid-entrapping means and rotatably mounted in dynamic balance about the carrier axis, in which the axes of the planet wheels are parallel to the carrier axis, and in which the intermediate drive means is adapted to transmit torque developed about the planet wheel axis to have the same direction about the carrier axis.

3. A torque transmitter according to claim 2 in which the containers are mounted on a planet wheel to have their openings directed in one direction about the planet wheel axis; whereby when a quantity of liquid is placed in the drum and when the carrier and drum rotate, the liquid is flung out in an annular layer against the inner peripheral surface of the drum under the action of centrifugal force during rotation of the drum about its axis, and the containers during rotation of the carrier dip into the layer of flung out liquid to receive liquid into them and whereby the containers in the region of the carrier axis release previously received liquid in a direction outwardly from the carrier axis towards the annular layer and past the planet wheel axis.

4. A torque transmitter according to claim 1 in which the carrier is provided with drive connecting means for connecting it to a source of rotary power.

5. A torque transmitter according to claim 3 in which the carrier is provided with drive connecting means for connecting it to a source of rotary power.

6. A torque transmitter according to claim 1 in which the drum is provided with drive connecting means for connecting it to a source of rotary power.

7. A torque transmitter according to claim 3 in which the drum is provided with drive connecting means for connecting it to a source of rotary power.

8. A torque transmitter according to claim 1 in which the engaging means includes an internal gear fast with the drum, and a toothed wheel fast with the planet wheel and in mesh with the internal gear, along an engagement region.

9. A torque transmitter according to claim 1 in which the engaging means includes a track around the inner periphery of the drum, and a roller fast with the planet wheel and adapted to roll on the track, and in which the carrier includes a main part and a swing arm for each planet wheel and mounted on the main part to pivot about an axis parallel to the planet wheel axis, the planet wheel being mounted on the swing arm; whereby the swing arm is adapted to swing outwardly, thus causing the roller to abut against the track, and to engage along an engagement region.

10. A torque transmitter according to claim 9 and having its drum provided with drive connecting means; in which there is provided bias means abutting between main part and swing arms and urging the swing arms outwardly to cause the rollers to abut against the track, for engaging along the engaging region.

11. A torque transmitter according to claim 8 in which the radius of the engaging means engagement region is less than the length of the container arm plus the spacing between planet wheel and carrier axes.

12. A torque transmitter according to claim 9 in which the intermediate drive means includes a toothed gear train including toothed gear wheels fast with the sun and planet wheels and an idler gear wheel in mesh with sun and planet wheels and mounted in the carrier main part to rotate about the swing arm pivotal axis.

13. A torque transmitter according to claim 3 in which the arm for a plurality of containers includes a pair of axially spaced plates, and in which each container is of substantially C-shape in section, the container opening being defined by the opposed lips of the C-section; whereby the positions of the containers and of their openings relative to the planet wheel axis may be varied suitably between the plates, before being secured in position on the plates, in order to obtain varying torque characteristics.

14. A torque transmitter according to claim 1 in which the ratio between planet wheel and sun wheel pitch diameters is not less than one half, the degree of eccentricity of the containers to the planet wheel axes not exceeding the distance between the planet wheel and carrier axes.

15. A torque transmitter according to claim 14 in which the ratio between planet wheel and sun wheel pitch diameters is of the order of unity and preferably is unity.

References Cited in the file of this patent

UNITED STATES PATENTS

| | | |
|---|---|---|
| 1,551,692 | Reece et al. | Sept. 1, 1925 |
| 1,691,610 | Reece et al. | Nov. 13, 1928 |
| 3,077,793 | Cancrinus | Feb. 19, 1963 |